(12) United States Patent
Kim et al.

(10) Patent No.: US 9,479,747 B2
(45) Date of Patent: Oct. 25, 2016

(54) GUIDE IMAGE GENERATION DEVICE AND METHOD USING PARAMETERS

(71) Applicant: CJ CGV CO., LTD., Seoul (KR)

(72) Inventors: Hwan Chul Kim, Seoul (KR); Su Ryeon Kang, Goyang-si (KR); Jihyung Kang, Hwaseong-si (KR)

(73) Assignee: CJ CGV CO., LTD., Seoul (KR)

( * ) Notice: Subject to any disclaimer, the term of this patent is extended or adjusted under 35 U.S.C. 154(b) by 277 days.

(21) Appl. No.: 14/218,367

(22) Filed: Mar. 18, 2014

(65) Prior Publication Data

US 2015/0055101 A1    Feb. 26, 2015

(30) Foreign Application Priority Data

Aug. 26, 2013 (KR) .................. 10-2013-0101339

(51) Int. Cl.
  *G03B 21/53* (2006.01)
  *G03B 21/14* (2006.01)
  *H04N 9/31* (2006.01)

(52) U.S. Cl.
  CPC .......... *H04N 9/3147* (2013.01); *G03B 21/147* (2013.01); *G03B 21/53* (2013.01); *H04N 9/3185* (2013.01)

(58) Field of Classification Search
  CPC .... G03B 21/147; G03B 21/14; G03B 21/13; G03B 21/53; H04N 9/3147; H04N 9/3185; H04N 9/31; H04N 9/3194
  USPC ................... 353/94, 30, 31, 69, 70
  See application file for complete search history.

(56) References Cited

U.S. PATENT DOCUMENTS

| 8,577,178 B2* | 11/2013 | Tamura ................ H04N 9/3185 348/580 |
| 2005/0052623 A1 | 3/2005 | Hsiung |
| 2006/0152680 A1* | 7/2006 | Shibano ................ G03B 37/04 353/30 |
| 2007/0273842 A1* | 11/2007 | Morrison ............... G03B 21/14 353/97 |
| 2011/0309999 A1* | 12/2011 | Chang .................... G03B 21/13 345/1.1 |
| 2012/0206696 A1* | 8/2012 | Haraguchi ........... H04N 9/3185 353/69 |

FOREIGN PATENT DOCUMENTS

| JP | 2000122193 A | 4/2000 |
| JP | 2005039788 A | 2/2005 |
| JP | 2007147786 A | 6/2007 |
| KR | 1020080050286 A | 6/2008 |
| KR | 101031062 B1 | 4/2011 |
| KR | 1020120020793 A | 3/2012 |

OTHER PUBLICATIONS

Korean Office Action for application No. 10-2013-0101339 dated May 21, 2015.
Written Opinion for application No. PCT/KR2014/000488 dated May 12, 2014.
International Search Report for application No. PCT/KR2014/000488 dated May 12, 2014.

* cited by examiner

*Primary Examiner* — William C Dowling
*Assistant Examiner* — Ryan Howard
(74) *Attorney, Agent, or Firm* — Hauptman Ham, LLP

(57) ABSTRACT

The present invention provides a guide image generation device including a database unit which stores parameters representing the structure of a multi-projection theater and a guide image generation unit which generates a guide image that will be used in an image correction process of the multi-projection theater using the parameters stored in the database unit.

14 Claims, 6 Drawing Sheets

- Entire Width = Theater Width + Theater Depth * 2
  (mm)

- Entire Height = Theater Height
  (mm)

- Guidimg Width = Guide image horizontal resolution
  (pixel)

- Pixel Ratio = $\dfrac{\text{Guidimg Width}}{\text{Entire Width}}$
  (pixel/mm)

FIG.5

- Guidimg Height = Entire Height * Pixel Ratio

- Left region : X = [ 0 ~ Theater Height * Pixel Ratio ]
  Front region : X = [ Theater Depth * Pixel Ratio ~
                       (Theater Depth + Theater Height) * Pixel Ratio ]
  Right region : X = [ (Theater Depth + Theater Height) * Pixel Ratio
                       ~ Guidimg Width ]

- Screen region : X = [ Guidimg Width / 2 - Screen Width / 2 * Pixel Ratio
                        ~ Guidimg Width / 2 - Screen Width / 2 * Pixel Ratio ]
                  Y = [ 0 ~ Screen Height * Pixel Ratio ]

Masking (Masking area)
→ Specified by A, B, C, D, E, F, G, and
  H pixel coordinates

| <Theater structure parameter DB> | | |
|---|---|---|
| Multi-projection theater A | Multi-projection theater B | Multi-projection theater C |
| · Theater Width A<br>· Theater Depth A<br>· Theater Height A<br>· Screen Width A<br>· Screen Offset A<br>· Screen Ratio A<br>· Front Depth A<br>· Rear Depth A<br>· Rear Height A | · Theater Width B<br>· Theater Depth B<br>· Theater Height B<br>· Screen Width B<br>· Screen Offset B<br>· Screen Ratio B<br>· Front Depth B<br>· Rear Depth B<br>· Rear Height B | · Theater Width C<br>· Theater Depth C<br>· Theater Height C<br>· Screen Width C<br>· Screen Offset C<br>· Screen Ratio C<br>· Front Depth C<br>· Rear Depth C<br>· Rear Height C |

GUIDE IMAGE GENERATION DEVICE AND METHOD USING PARAMETERS

CROSS REFERENCE TO RELATED APPLICATION

This application claims the priority of Korean Patent Application No. 10-2013-0101339, filed on Aug. 26, 2013 in the KIPO (Korean Intellectual Property Office) which is incorporated herein by reference in its entirety.

TECHNICAL FIELD

The present invention relates to a guide image generation device and method using parameters and, more particularly, to a device and method which can store parameters, which represent the structure of a "multi-projection theater", in a database and generate a guide image of the "multi-projection theater" using the parameters stored in the database.

BACKGROUND ART

Conventionally, in order to reproduce images such as movies, advertisements, etc., two-dimensional images are projected on a single screen arranged in front of a theater. However, audiences can only watch two-dimensional (2D) images under such a system.

Three-dimensional (3D) image technologies for providing the audience with 3D images have recently been developed. 3D image technologies use the principle of allowing an audience to feel the 3D effect even from a flat image when different images are presented to the left and right eyes of the audience and combined in the brain. In detail, two cameras equipped with different polarizing filters are used during filming, and the audience wears glasses with polarizing filters such that different images are presented to the left and right eyes during watching.

However, while these 3D technologies can provide the audience with 3D images, the audience just watches the images reproduced on a single screen, which may reduce the degree of involvement in the images. Moreover, the direction of the 3D effect that the audience feels is limited to the direction of the single screen.

Furthermore, according to the conventional 3D technologies, the audience must wear the glasses equipped with polarizing filters during watching, which may make the audience feel inconvenient, and different images are artificially presented to the left and right eyes, which may make some sensitive audiences feel dizzy or nausea.

Therefore, a so-called "multi-projection system" which can solve the problems of the conventional projection systems based on a single screen has been proposed. The "multi-projection system" refers to a technology in which a plurality of projection surfaces (e.g., a screen, wall, etc.) are arranged around the auditorium and a unified image is reproduced on the plurality of projection surfaces, thus providing the audience with the three-dimensional effect and immersion. Moreover, a "multi-projection theater" refers to a theater in which the "multi-projection system" is constructed.

Meanwhile, in order to effectively operate the "multi-projection system", it is necessary to effectively correct the images projected on the plurality of projection surfaces. The reason for this is that in the "multi-projection system", a plurality of images, which are projected on the plurality of projection surfaces, not on a single projection surface, should be corrected in an integrated manner, and the correction method of the plurality of images should be changed to accommodate a change in the structure of the theater, which makes the image correction process very complex and increases the probability of errors.

Therefore, there is a need to develop technologies that can be helpful to the image correction process of the "multi-projection system".

The present invention has been made based on the above technical background and also made in an effort to solve the above-mentioned problems and to provide additional technical elements that cannot be easily invented by those skilled in the art.

DISCLOSURE OF INVENTION

Technical Problem

An object of the present invention is to generate a guide image that can be helpful to an image correction process of a "multi-projection theater".

Moreover, another object of the present invention is to store parameters, which represent the structure of a multi-projection theater, in a database and generate a guide image optimized for an image correction process of the multi-projection theater" using the parameters stored in the database.

Furthermore, still another object of the present invention is to generate two or more guide images, which are optimized for two or more multi-projection theaters, in an integrated manner.

The technical objects of the present invention are not limited to the above-mentioned technical objects, and various other technical objects can be included within the range obvious to those skilled in the art from the following description.

Solution to Problem

To achieve the above object, a guide image generation device in accordance with an embodiment of the present invention may comprise: a guide image generation unit which generates a guide image of a multi-projection theater, which will be used in an image correction process of the multi-projection theater, using parameters representing the structure of the multi-projection theater.

In the guide image generation device in accordance with an embodiment of the present invention, the guide image may be an image corresponding to a plane development showing a plurality of surfaces of the multi-projection theater.

In the guide image generation device in accordance with an embodiment of the present invention, the guide image may comprise: a front region corresponding to a front surface of the theater; a left region corresponding to a left wall surface of the theater; and a right region corresponding to a right wall surface of the theater.

In the guide image generation device in accordance with an embodiment of the present invention, the front region may comprise a screen area and the left region or the right region may comprise a masking area.

In the guide image generation device in accordance with an embodiment of the present invention, the parameters may comprise a parameter representing the width of the front side of the theater, a parameter representing the depth of the theater, a parameter representing the height of the theater, a parameter representing the width of a screen, a parameter representing the ratio of the screen, a parameter representing the length from the top of the screen to a ceiling, a parameter representing the length from the screen to an auditorium, a parameter representing the length from a back seat of the auditorium to a rear side, or a parameter representing the height of the back seat of the auditorium.

In the guide image generation device in accordance with an embodiment of the present invention, the guide image generation unit may determine the width of the guide image based on the parameter representing the width of the front side of the theater and the parameter representing the depth of the theater and determine the height of the guide image using the parameter representing the height of the theater.

In the guide image generation device in accordance with an embodiment of the present invention, the guide image generation unit may calculate pixel ratio information representing the ratio of an actual length to the number of pixels using the width of the guide image and horizontal resolution information of the guide image or using the height of the guide image and vertical resolution information of the guide image.

In the guide image generation device in accordance with an embodiment of the present invention, the guide image generation unit may determine a full resolution of the guide image using the pixel ratio information.

In the guide image generation device in accordance with an embodiment of the present invention, the guide image generation unit may generate region information of the guide image using the pixel ratio information, and the region information of the guide image may include pixel coordinate information.

In the guide image generation device in accordance with an embodiment of the present invention, the guide image may comprise: a combination of a grid pattern and a circular pattern; and a reference line formed based on the screen region.

In the guide image generation device in accordance with an embodiment of the present invention, the parameters may be generated based on actual measurement information of the theater, drawing information of the theater, or input information.

Moreover, to achieve the above object, an integrated guide image generation system in accordance with an embodiment of the present invention may comprise: two or more multi-projection theaters in which a multi-projection system is constructed, respectively; a guide image generation device which generates two or more guide images of the two or more multi-projection theaters using parameters for the two or more multi-projection theaters, and the parameters may represent the structure of each multi-projection theater.

In the integrated guide image generation system in accordance with an embodiment of the present invention, each guide image may be an image corresponding to a plane development showing a plurality of surfaces of each multi-projection theater.

In the integrated guide image generation system in accordance with an embodiment of the present invention, the guide image generation device may generate content for each theater with respect to specific content using the two or more guide images and distribute the generated content to each theater.

Furthermore, to achieve the above object, a guide image generation method in accordance with an embodiment of the present invention may comprise the step of generating, at a guide image generation device, a guide image that will be used in an image correction process of a multi-projection theater using parameters representing the structure of the multi-projection theater.

In the image generation method in accordance with an embodiment of the present invention, the guide image may be an image corresponding to a plane development showing a plurality of surfaces of the multi-projection theater.

Advantageous Effects of Invention

The present invention generates a guide image using parameters representing the structure of a multi-projection theater and thus can generate a guide image that can matches the structure of the multi-projection theater.

Moreover, the present invention can cover all of the plurality of projection surfaces installed in the multi-projection theater. Therefore, the present invention can perform a correction process on the plurality of projection surfaces in a batch manner by means of the guide image.

Furthermore, the present invention can store the parameters representing the structure of the multi-projection theater in a database and then generate the guide image based on the parameters stored in the database and a predetermined operation. Therefore, the present invention is easy to integratedly manage or standardize the guide images for the multi-projection system.

In addition, the present invention can manage parameter information of two or more multi-projection theaters in an integrated manner. The present invention can generate two or more guide images of the two or more multi-projection theaters and then distribute the generated guide images. Therefore, the present invention can process the guide image generation process for the respective multi-projection theaters from the outside in an integrated manner, thus simplifying the structure of each multi-projection theater.

Additionally, the present invention can automatically reconfigure content to match the characteristics of each theater using the generated guide images and thus can allow the various theaters to screen the content at the same time without having to create the content repeatedly according to the structures of the theaters.

The effects of the present invention are not limited to the above-mentioned effect, and various other effects can be included within the range obvious to those skilled in the art from the following description.

MODE FOR THE INVENTION

Hereinafter, a guide image generation device and method according to the present invention will be described in detail with reference to the accompanying drawings. The following embodiments are provided only for illustrative purposes so that those skilled in the art can fully understand the spirit of the present invention, but the present invention is not limited thereby. Moreover, it is to be understood that all matters herein set forth in the accompanying drawings are to be interpreted as illustrative and may be in different forms from those actually implemented.

Meanwhile, components described below are merely examples to implement the present invention. Therefore, other components may be used in other embodiments without departing from the idea and scope of the invention. Moreover, each component may be implemented only in hardware, or only in software, or in various combinations of hardware and software performing the same functions.

Moreover, the term "comprising" specific components is an "open-ended term" that simply means that the corresponding components are present and should not be understood to exclude other additional components.

Furthermore, when a component is mentioned to be "connected" to or "accessing" another component, this may mean that it is directly connected to or accessing the other component, but it is to be understood that another component may exist inbetween.

As mentioned above, the term "multi-projection theater" refers to a theater in which a "multi-projection system" is constructed.

Next, the "multi-projection system" that is the basis of the present invention will now be described briefly, and then the present invention will be described in detail later.

The multi-projection system that is the basis of the present invention refers to a system which can provide synchronized images on a plurality of projection surfaces installed in a single theater and maximize the reality, three-dimensional effect, and immersion that the audience can feel in these environments. That is, the multi-projection system refers to a system in which a plurality of projection surfaces are provided in a single theater to provide the audience with synchronized images on the plurality of projection surfaces.

The plurality of projection surfaces are provided for multi-projection in a single theater. A plurality of images may be reproduced on the plurality of projection surfaces. Here, it is preferable that the images reproduced on the plurality of projection surfaces are synchronized with each other and generally create a unified image. That is, while different images may be reproduced on the respective projection surfaces, it is preferable that the images on the respective projection surfaces are associated with each other to create a unified image when viewed over the entire projection surface.

Moreover, the plurality of projection surfaces may be arranged to surround the auditorium in the theater. Therefore, the audience can feel as if they are in a space created by the synchronized images reproduced on the plurality of projection surfaces, and thus the three-dimensional effect, immersion, and virtual reality that the audience feels can be maximized.

Furthermore, the plurality of projection surfaces may be arranged in various positions such a front side, a left side, a right side, an upper side (e.g., ceiling), a lower side (e.g., floor), etc. with respect to the auditorium.

In addition, the plurality of projection surfaces may comprise various types of projection surfaces such as a screen, wall, fixture surface, etc. and may comprise different types of projection surfaces at the same time.

Additionally, the images projected on the plurality of projection surfaces may be projected by two or more projection devices installed in the theater, and these two or more projection devices may be implemented by including an optical system and a heating unit in various manners. For example, the projection devices may be implemented in various ways, such as by using a cathode ray tube (CRT), using a liquid crystal display (LCD), by digital light processing (DLP) using a digital micromirror device (DMD) chip, by liquid crystal on silicon (LCoS), by using a laser light source, etc. as well as various other ways. In addition, the two or more projection devices may be electrically connected to a theater management device (e.g., a theater management server) and then integratedly controlled by the theater management device and may project images on the plurality of projection surfaces under the control of the theater management device.

Figure 1:
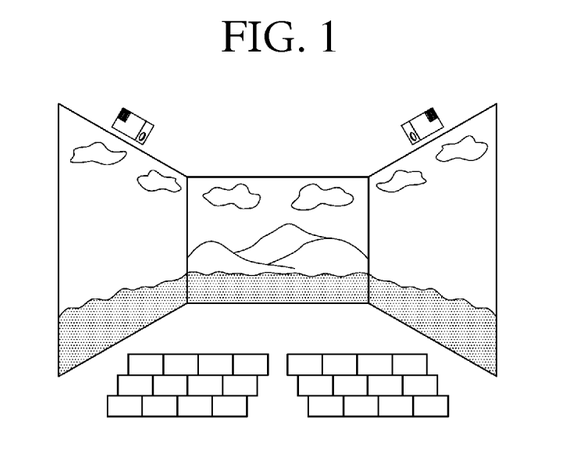
FIG. 1 is a diagram showing an example of a multi-projection system.

Meanwhile, referring to FIG. 1, a basic structure of the "multi-projection system" is shown (for reference, the "multi-projection system" may be configured into various structures as mentioned above, but when the "multi-projection system" is constructed based on the structure of the conventional theater as it is, a multi-projection theater having the basic structure shown in FIG. 1 is constructed).

The basic structure of the "multi-projection system" may comprise a front projection surface, a left projection surface, and a right projection surface (with respect to the auditorium) as shown in FIG. 1.

Here, the front projection surface may be formed with a traditional screen, the left projection surface may be formed with a left wall, and the right projection surface may be formed with a right wall.

Next, a guide image generation device 100 in accordance with an embodiment of the present invention will be described with reference to FIGS. 2 to 7.

Figure 2:
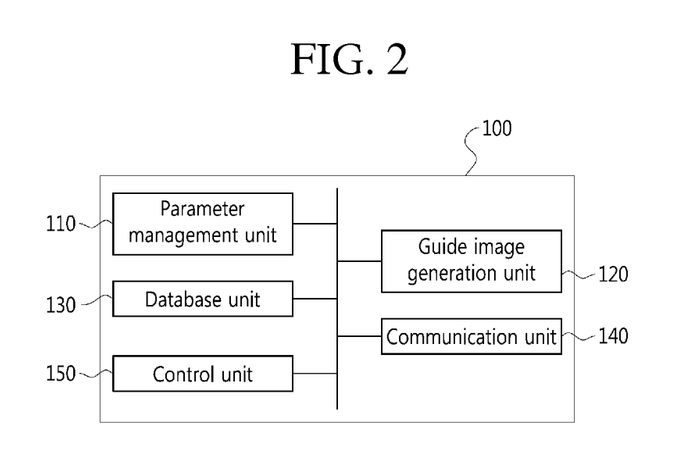
FIG. 2 is a diagram showing the configuration of a guide image generation device in accordance with an embodiment of the present invention.

Referring to FIG. 2, the guide image generation device 100 may comprise a parameter management unit 110 which manages parameters representing the structure of a multi-projection theater, a guide image generation unit 120 which generates a guide image projected in the multi-projection theater using the parameters managed by the parameter management unit 110, a database unit 130 which stores the parameters managed by the parameter management unit 110 and the guide image generated by the guide image generation unit 120, a communication unit 140 which transmit and receive data, and a control unit 150 which controls the operation of the parameter management unit 110, the guide image generation unit 120, the, and the communication unit 140.

Moreover, the guide image generation device 100 may further comprise an input unit for inputting data, a display unit for displaying information, etc. as well as components associated with the generation of the guide image, other than the above-mentioned components.

Furthermore, the guide image generation device 100 may operate in conjunction with an external device. For example, the guide image generation device 100 may operate in conjunction with a user terminal, a server, a measurement device for measuring the structure of the multi-projection theater (e.g., a laser-based device, an X-ray-based device, a white light-based device, an infrared measurement device, etc.), a camera device installed in the multi-projection theater, etc.

The guide image is a reference image that can be used for a process of correcting images projected in the multi-projection theater (images projected on a plurality of projection surfaces=images projected by two or more projection devices).

The guide image may be projected, before images to be actually screened are projected, to be used as a medium for collecting basic information for image correction, such as distortion information due to the surface structure of each projection surface, information on difference in properties of the plurality of projection surfaces (e.g., a difference in color, a difference in reflectance, etc.), information on differences in performance of the two or more projection devices (e.g., a difference in brightness, etc.), masking area information, etc.

Moreover, the guide image can be used for a process assigning images to the two or more projection devices, a process of checking and reviewing the result of the image correction, etc. and can be used for various processes associated with the image correction other than the above processes.

The parameter management unit 110 manages parameters representing the structure of a multi-projection theater. For example, the parameter management unit 110 may generate, modify, and update the parameters representing the structure of the multi-projection theater based on actual measurement information of the multi-projection theater, image information of the multi-projection theater, drawing information of the multi-projection theater, input information, etc.

Here, the actual measurement information of the multi-projection theater is information generated by a measurement device for measuring the structure of the multi-projection theater and may be transmitted through the communication unit 140, etc. Moreover, the image information of the multi-projection theater is information generated by a camera device for imaging the structure of the multi-projection theater and may also be transmitted through the communication unit 140, etc. Furthermore, the image information of the multi-projection theater may reflect position information (or installation information) of the projection device, which is automatically generated by a sensor (e.g., a gyroscope) installed in the projection device, and then transmitted. Moreover, the drawing information of the multi-projection theater is information corresponding to design drawing information, structural drawing information, etc. which represent the structure of the multi-projection theater, and may be transmitted through the communication unit 140 or transmitted from the database unit 130, preferably transmitted in the form of a CAD file. Furthermore, the input information is information input by a user and may be transmitted through the input unit or transmitted through a user terminal connected to the communication unit 140.

Figure 3:
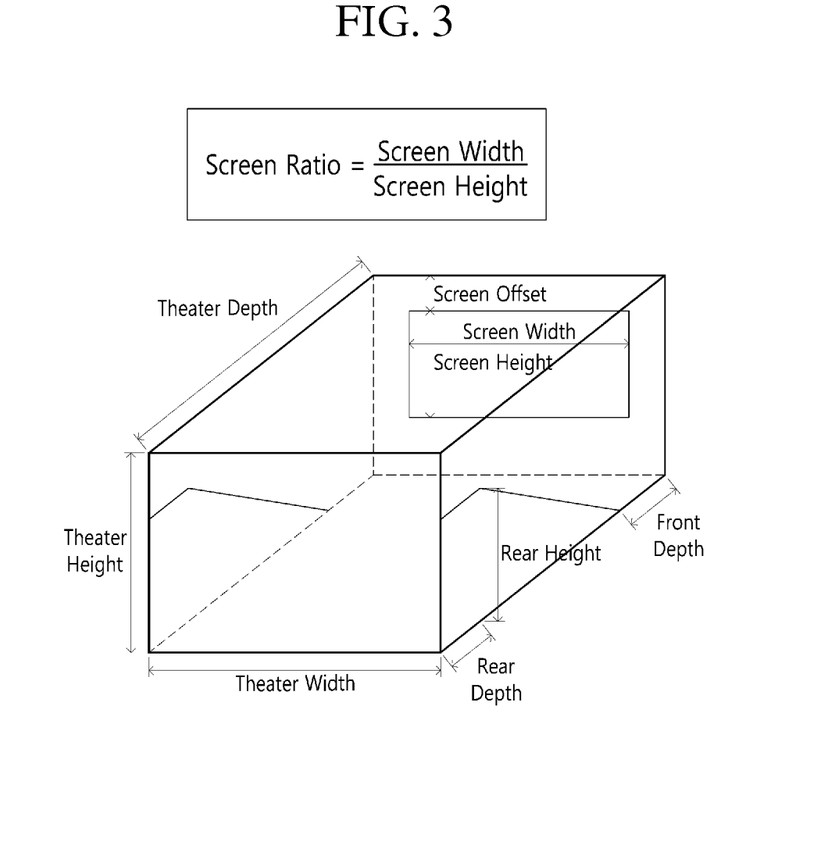
FIG. 3 is a diagram showing an example of theater structure parameters which can be used in the present invention.

The parameter management unit 110 may generate a plurality of parameters that can represent the structure of the multi-projection theater. For example, when the multi-projection theater has the above-described basic structure (in which the multi-projection system having the basic structure is constructed), the parameter management unit 110 may generate at least nine parameters that can represent the basic structure. Specifically, the parameter management unit 110 may generate (1) a "Theater Width" parameter representing the width of the front side of the theater, (2) a "Theater Depth" parameter representing the depth of the theater, (3) a "Theater Height" parameter representing the height of the theater, (4) a "Screen Width" parameter representing the width of the screen, (5) a "Screen Ratio" parameter representing the ratio of the screen, (6) a "Screen Offset" parameter representing the length from the top of the screen to the ceiling, (7) a "Front Depth" parameter representing the length from the screen to the auditorium, (8) a "Rear Depth" parameter representing the length from the back seat of the auditorium to the rear side, and (9) a "Rear Height" parameter representing the height of the back seat of the auditorium. These nine parameters are shown in FIG. 3.

Meanwhile, the parameters generated by the parameter management unit 110 may preferably be stored in the database unit 130 and managed in an integrated manner.

The guide image generation unit 120 generates a guide image of the multi-projection theater using the parameters generated by the parameter management unit 110. Specifically, the guide image generation unit 120 generates the guide image, which can be used for the image correction process of the multi-projection theater, using the parameters generated by the parameter management unit 110 and then stored in the database unit 130.

In this case, it is preferable that the guide image generation unit 120 generates a guide image in the form of a plane development showing the plurality of surfaces of the multi-projection theater (e.g., a front surface, a left surface, a right surface, a ceiling surface, a floor surface, etc.). As a result, it is possible to generate a guide image that can match the entire structure of the multi-projection theater and represent sub-region information of the guide image in the form of simple two-dimensional information.

Figure 6:
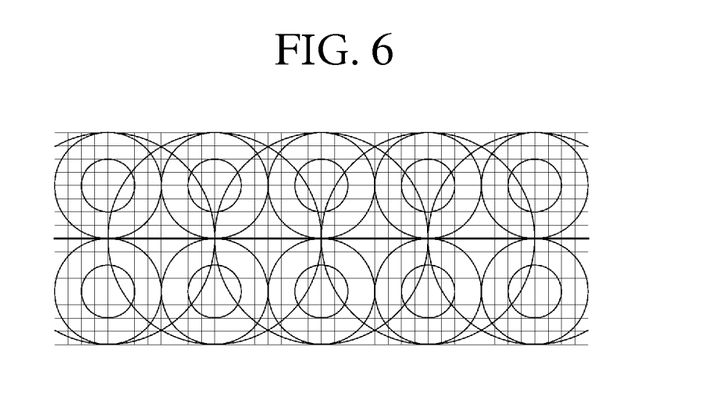
FIG. 6 is a diagram showing an example of a combination of a grid pattern and a circular pattern that may be formed on a guide image.

Moreover, it is preferable that the guide image generation unit 120 generate a guide image having a combination of a grid pattern and a circular pattern. With the combined pattern, it is possible to easily collect image distortion information in a process of collecting basis information for image correction or in a process of checking the result of the image correction. Referring to FIG. 6, an example of the guide image having the combined pattern is shown.

Figure 4:
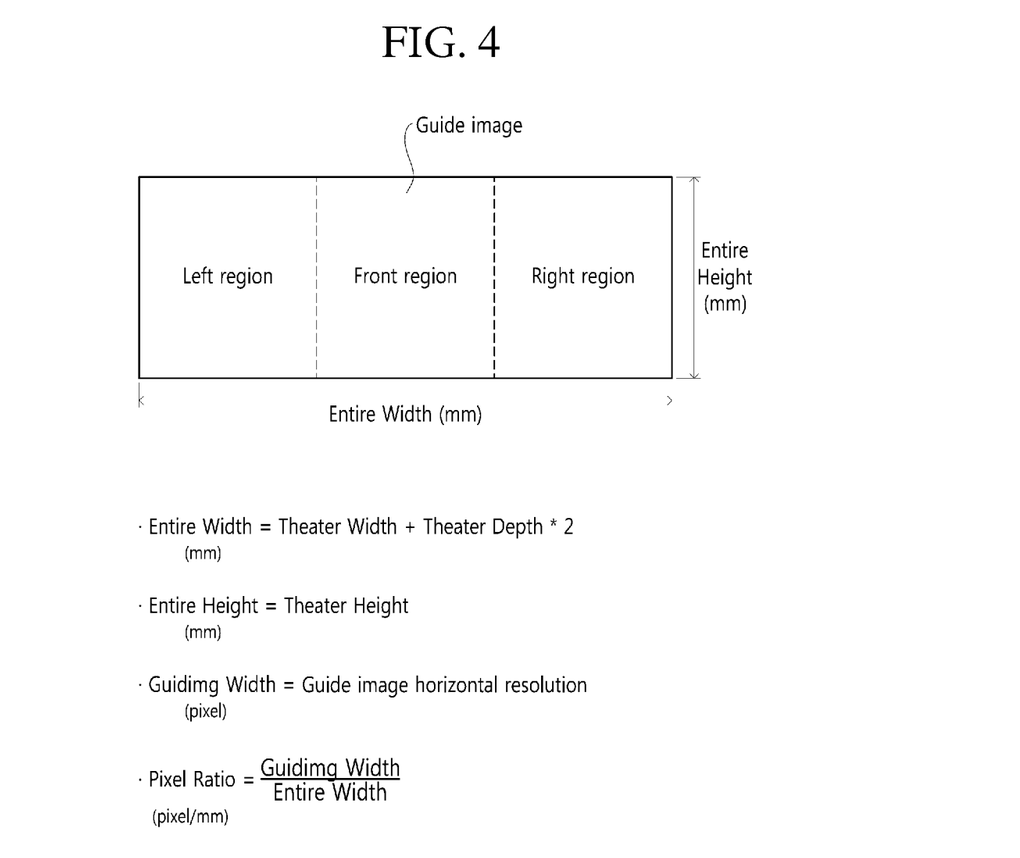
FIGS. 4 and 5 are diagrams showing examples of a guide image according to the present invention.
Figure 7:
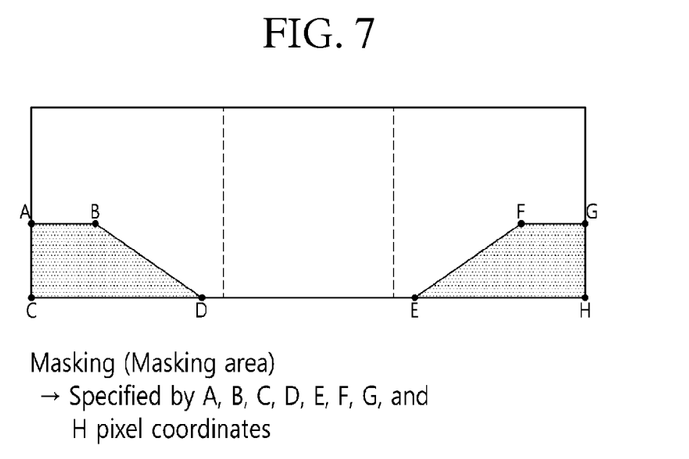
FIG. 7 is a diagram showing an example of masking areas that may be formed on a guide image.

Referring to FIGS. 4 and 7, examples of the guide image, which can be generated when the multi-projection theater has the basic structure, are shown.

When the multi-projection theater has the basic structure, the guide image generation unit 120 may generate a guide image corresponding to the multi-projection theater of the basic structure using various parameters including the above-described nine parameters. For example, the guide image generation unit 120 may determine a "Entire Width" parameter of the guide image (i.e., the width of the projected guide image) based on the "Theater Width" parameter representing the width of the front side of the theater and the "Theater Depth" parameter representing the depth of the theater and may determine the height of the guide image (i.e., the height of the projected guide image) based on the "Theater Height" representing the height of the theater.

Entire Width (mm)=Theater Width (mm)+2*Theater Depth (mm)

Entire Height (mm)=Theater Height (mm)

Moreover, the guide image generation unit 120 may determine the full resolution of the guide image (1) by first setting a horizontal resolution of the guide image and then calculating a vertical resolution corresponding to the set horizontal resolution or (2) by first setting a vertical resolution of the guide image and then calculating a horizontal resolution corresponding to the set vertical resolution.

In the former case, the guide image generation unit 120 first sets horizontal resolution information (Guideimg Width) of the guide image to a predetermined value (e.g., 9216 Pixels) and then calculates pixel ratio information (Pixel Ratio) representing the ratio of the actual length (mm, the length of the projected guide image) to the number of pixels (Pixel) using the set horizontal resolution information (Guideimg Width) and the width of the guide image (Entire Width).

Pixel Ratio(Pixel/mm)=(Guideimg Width/Entire Width)

After the pixel ratio information (Pixel Ratio) is calculated, the guide image generation unit 120 determines the vertical resolution (Guideimg Height) of the guide image using the pixel ratio information (Pixel Ratio) and the height of the guide image (Entire Height).

Guideimg Height=Pixel Ratio*Entire Height

As a result, the guide image generation unit 120 can determine the full resolution of the guide image through these processes.

In the latter case, the guide image generation unit 120 first sets vertical resolution information (Guideimg Height') of the guide image to a predetermined value (e.g., 3012 Pixels) and then calculates pixel ratio information (Pixel Ratio') representing the ratio of the actual length (mm, the length of the projected guide image) to the number of pixels (Pixel) using the set vertical resolution information (Guideimg Height') and the Height of the guide image (Entire Height).

Pixel Ratio'(Pixel/mm)=(Guideimg Height'/Entire Height)

After the pixel ratio information (Pixel Ratio') is calculated, the guide image generation unit 120 determines the horizontal resolution (Guideimg Width') of the guide image using the pixel ratio information (Pixel Ratio') and the width of the guide image (Entire Width).

Guideimg Width'=Pixel Ratio'*Entire Width

As a result, the guide image generation unit 120 can determine the full resolution of the guide image through these processes.

Meanwhile, the guide image generation unit 120 may divide the guide image into sub-regions using the pixel ratio information (Pixel Ratio or Pixel Ratio') generated in the above manner and generate information on the divided sub-regions. Specifically, the guide image generation unit 120 may divide the guide image into sub-regions using the pixel ratio information (Pixel Ratio or Pixel Ratio') and the parameters (such as Theater Width, Theater Depth, Theater Height, Screen Width, Screen Offset, Screen Ratio, Front Depth, Rear Depth, Rear Height, etc.) stored in the database unit 130 and may generate information on the divided sub-regions.

Figure 5:
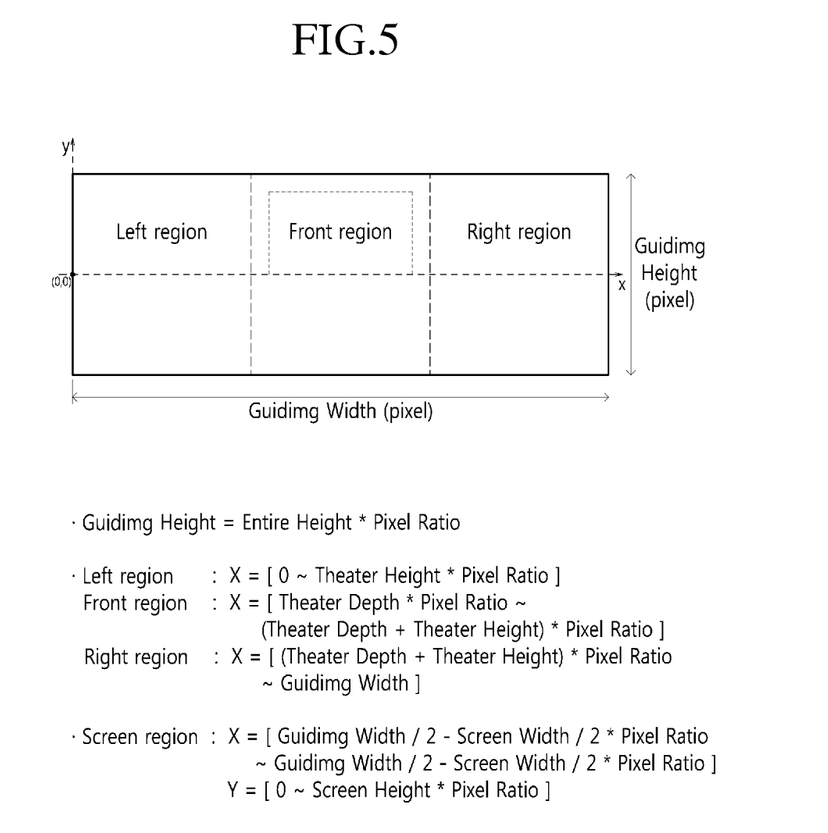

For example, as shown in FIG. 5, the guide image generation unit 120 may divide the generated guide image into a left region, a front region, and a right region and may generate information on the corresponding regions (for reference, in the example of FIG. 5, the pixel ratio (Pixel Ratio) based on the horizontal resolution information, the point from which the left region starts is set to X=0, and the bottom of the screen is set to Y=0).

Left region: X=[0 to Theater Height*Pixel Ratio]

Front region: X=[Theater Depth*Pixel Ratio to(Theater Depth+Theater Width)*Pixel Ratio]

Right region: X=[(Theater Depth+Theater Width)*Pixel Ratio to Guideimg Width]

Moreover, as shown in FIG. 5, the guide image generation unit 120 may separate a screen region formed in the front region and may generate information on the corresponding region.

Screen region: X=[Guideimg Width/2−(Screen Width/2)*Pixel Ratio to Guideimg Width/2+(Screen Width/2)*Pixel Ratio],Y=[0 to Screen Height*Pixel Ratio]

Moreover, the guide image generation unit 120 may further generate reference line information relating to the screen region.

Screen center vertical line: X=Guideimg Width/2

Screen center horizontal line: Y=(Screen Height/2)*Pixel Ratio

Screen top horizontal line: Y=(Screen Height)*Pixel Ratio

Screen bottom horizontal line: Y=0

These reference line information can be used in a process of align the screen region with the left and right regions (i.e., Alignment process).

Moreover, these reference lines may be visually represented on the guide image together with the combination of a grid pattern and a circular pattern.

Furthermore, as shown in FIG. 7, the guide image generation unit 120 may separate a masking area (for masking the projection of the image to avoid the glare of the audience) formed on the left or right side and may generate information on the corresponding area.

In this case, the guide image generation unit 120 may separate the masking area using the parameters, such as the "Front Depth" parameter representing the length from the screen to the auditorium, the "Rear Depth" parameter representing the length from the back seat of the auditorium to the rear side, the "Rear Height" parameter representing the height of the back seat of the auditorium, etc., and the pixel ratio information (Pixel Ratio) and may represent the corresponding area using the vertex coordinates of the masking area.

FIG. 7 shows the masking areas in the form of a quadrangle. The masking area included in the left region may be specified by A, B, C, and D coordinates, and the masking area included in the right region may be specified by E, F, G, and H coordinates.

Therefore, the guide image generation unit 120 generates the guide image matching the structure of the multi-projection theater and, at the same time, information on the sub-regions of the multi-projection theater, and thus it is possible to significantly improve the accuracy of the multi-projection image correction process and also significantly reduce the probability of occurrence of image distortion.

The database unit 130 is configured to store a variety of information in a database. The database unit 130 may store a variety of information generated by the guide image generation device 100 and, in particular, store the parameters generated by the parameter management unit 110, the guide image generated by the guide image generation unit 120, the region information of the guide image generated by the guide image generation unit 120, etc.

Meanwhile, the database unit 130 may comprise various types of memory devices and may temporarily or permanently store a variety of information.

The communication unit 140 is configured to allow the guide image generation device 100 to transmit and receive data to and from external devices. For example, the communication unit 140 may be connected to a measurement device, a camera device, a user terminal, etc. in a wired or wireless manner to transmit and receive various data based on this connection.

Meanwhile, the communication unit 140 may be implemented in the form of various wired or wireless communication devices that can meet ISO, ITU, IEC, and IEEE standards and may also be implemented with various communication devices other than these standards.

The control unit 150 is configured to control various operations of the guide image generation device 100 including the parameter management unit 110, the guide image generation unit 120, the database unit 130, and the communication unit 140.

The control unit 150 may comprise at least one arithmetic means, and the arithmetic means may be a general central processing unit (CPU), but may be a programmable logic device (e.g., CPLA, FPGA, etc.), an application-specific integrated circuit (ASIC), or a microcontroller chip, which is implemented for a specific purpose.

The above-described guide image generation device 100 may be implemented with various electronic devices. The guide image generation device 100 may be implemented with a single electronic device or with several electronic devices interconnected to each other. For example, the guide image generation device 100 may be implemented in a single server or in such a manner that two or more servers are interconnected. Moreover, the guide image generation device 100 may be implemented in such a manner that a server and other electronic devices are interconnected or implemented in arithmetic units other than the server.

Next, an integrated guide image generation system in accordance with an embodiment of the present invention will be described with reference to FIGS. 8 and 9.

Figure 8:
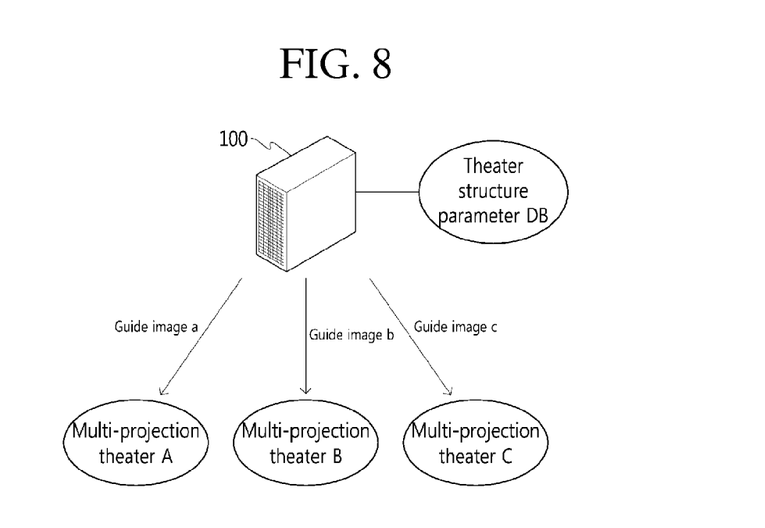
FIG. 8 is a conceptual diagram showing that a guide image generation device in accordance with an embodiment of the present invention operates in conjunction with two or more multi-projection theaters.
Figure 9:
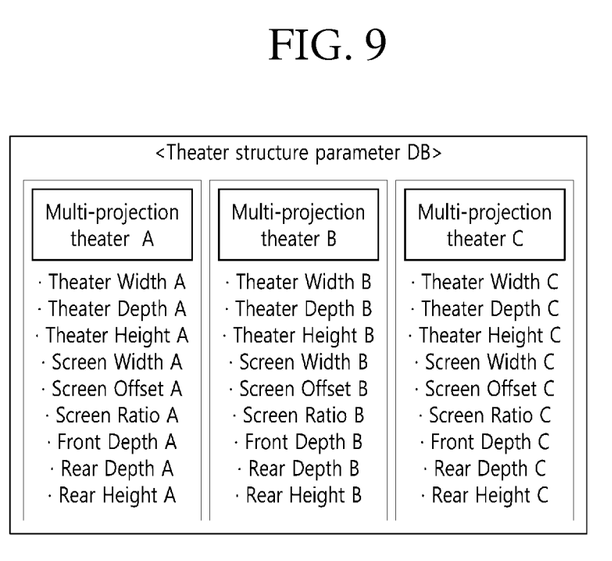
FIG. 9 is a diagram showing an example of a theater structure parameter database which can be used in the present invention.

The guide image generation device 100 in accordance with an embodiment of the present invention may operate in conjunction with two or more multi-projection theaters as shown in FIG. 8. That is, the guide image generation device 100 may generate two or more guide images of the two or more multi-projection theaters and then distribute the generated guide image to each multi-projection theater.

Therefore, based on this operation, it is possible to construct an "integrated guide image generation system" that manages the guide images of the two or more multi-projection theaters in an integrated manner.

In this case, it is preferable that the parameter management unit 110 of the guide image generation device 100 generally manage parameters representing the structures of the two or more multi-projection theaters.

Moreover, it is preferable that the database unit 130 stores the parameters of the two or more multi-projection theaters, managed by the parameter management unit 110, in a database. Here, it is preferable that the database unit 130 construct the database in a manner that identification information of each multi-projection theater matches parameter information of each multi-projection theater.

Furthermore, the communication unit 140 may be connected to the "multi-projection system" (e.g., a server operated by the system, etc.) constructed in each of the two or more multi-projection theaters through a wired or wireless communication network and may receive drawing information of each multi-projection theater, input information, etc. or transmit generated guide images.

In addition, the guide image generation unit 120 may generate two or more guide images of the two or more multi-projection theaters and then distribute the generated guide image to each multi-projection theater. For example, the guide image generation unit 120 may generate a guide image (guide image a) of multi-projection theater A using parameters of multi-projection theater A and transmit the generated guide image (guide image a) to multi-projection theater A. Moreover, the guide image generation unit 120 may also generate a guide image (guide image b) of multi-projection theater B using parameters of multi-projection theater B and transmit the generated guide image (guide image b) to multi-projection theater B.

Meanwhile, the guide image generation unit 120 may generate region information of the guide image at the same time when the guide image of each multi-projection theater is generated and may generate the generated region information together.

While the guide image generation device 100 may generate the two or more guide images of the two or more multi-projection theaters and then distribute the generated guide image to each multi-projection theater as mentioned above, the guide image generation device 100 may generate the two or more guide images and then generally create image content to be screened in each multi-projection theater while autonomously managing the generated guide images. For example, the guide image generation device 100 may generate "a guide image of theater A, a guide image of theater B, and a guide image of theater C" and then automatically generate "advertising content of company X to be screened in projection A, advertising content of company X to be screened in projection B, and advertising content of company X to be screened in projection C" (the advertising contents of company X are reconfigured to match the structure of each theater) using the generated guide images of the respective theaters and may distribute the generated advertizing content for each theater to each theater.

Next, a guide image generation method in accordance with an embodiment of the present invention will be described.

The guide image generation method in accordance with an embodiment of the present invention may comprise the step of retrieving, at a guide image generation device, parameters representing the structure of a multi-projection theater from a database (step a).

Moreover, the guide image generation method may comprise, after step a, the step of generating, at the guide image generation device, a guide image that will be used in an image correction process of the multi-projection theater using the parameters (Step b).

Meanwhile, the guide image generation method may be implemented in the form of a program and then stored in a recording medium readable by an electronic device or transmitted and received through a communication network. Moreover, the guide image generation method implemented in the form of a program may be temporarily or permanently stored in various electronic devices.

Moreover, the above-described guide image generation method is in a different category from the guide image generation device, but may have substantially the same features as the guide image generation device. Therefore, although the guide image generation method has not been described in detail to avoid repetitive description, the above-described features associated with the guide image generation device may also be applied to the guide image generation method.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

The invention claimed is:

1. A guide image generation device comprising:
a guide image generation unit configured to generate a guide image for guiding an image correction process of a multi-projection theater, using parameters representing a structure of the multi-projection theater,
wherein the guide image comprises
a front region corresponding to a front surface of the multi-projection theater,
a left region corresponding to a left wall surface of the multi-projection theater, and
a right region corresponding to a right wall surface of the multi-projection theater,
wherein
the front region comprises a screen area, and
the left region or the right region comprises a masking area.

2. The guide image generation device of claim 1, wherein the guide image is an image corresponding to a plane development showing the front surface, the left wall surface and the right wall surface of the multi-projection theater.

3. The guide image generation device of claim 1, wherein the parameters comprise:
a parameter representing the width of the front side of the theater,
a parameter representing the depth of the theater,
a parameter representing the height of the theater,
a parameter representing the width of a screen,
a parameter representing the ratio of the screen,
a parameter representing the length from the top of the screen to a ceiling,
a parameter representing the length from the screen to an auditorium,
a parameter representing the length from a back seat of the auditorium to a rear side, or
a parameter representing the height of the back seat of the auditorium.

4. The guide image generation device of claim 3, wherein the guide image generation unit determines the width of the guide image based on the parameter representing the width of the front side of the theater and the parameter representing the depth of the theater and determines the height of the guide image using the parameter representing the height of the theater.

5. The guide image generation device of claim 4, wherein the guide image generation unit calculates pixel ratio information representing the ratio of an actual length to the number of pixels using the width of the guide image and horizontal resolution information of the guide image or using the height of the guide image and vertical resolution information of the guide image.

6. The guide image generation device of claim 5, wherein the guide image generation unit determines a full resolution of the guide image using the pixel ratio information.

7. The guide image generation device of claim 5, wherein the guide image generation unit generates region information of the guide image using the pixel ratio information, the region information of the guide image including pixel coordinate information.

8. The guide image generation device of claim 1, wherein the guide image comprises:
a combination of a grid pattern and a circular pattern; and
a reference line formed based on the screen area.

9. The guide image generation device of claim 1, wherein the parameters are generated based on actual measurement information of the theater, drawing information of the theater, or input information about the theater.

10. An integrated guide image generation system comprising:
a plurality of multi-projection theaters in which a multi-projection system is constructed, respectively; and
a guide image generation device configured to generate a plurality of guide images for guiding image correction processes of the plurality of multi-projection theaters using parameters for the plurality of multi-projection theaters,
wherein the parameters represent structures of the plurality of multi-projection theaters,
wherein each guide image of the plurality of the guide images comprises
a front region corresponding to a front surface of a corresponding multi-projection theater of the plurality of multi-projection theaters,
a left region corresponding to a left wall surface of the corresponding multi-projection theater, and
a right region corresponding to a right wall surface of the corresponding multi-projection theater,
wherein
the front region comprises a screen area, and
the left region or the right region comprises a masking area.

11. The integrated guide image generation system of claim 10, wherein the each guide image is an image corresponding to a plane development showing the front surface, the left wall surface and the right wall surface of the corresponding multi-projection theater.

12. The integrated guide image generation system of claim 10, wherein the guide image generation device configured to
generate content for the each multi-projection theater with respect to specific content using the plurality of guide images and
distribute the generated content to the corresponding multi-projection theater.

13. A guide image generation method, comprising:
generating, at a guide image generation device, a guide image for guiding an image correction process of a multi-projection theater using parameters representing a structure of the multi-projection theater,
wherein the guide image comprises
a front region corresponding to a front surface of the multi-projection theater,
a left region corresponding to a left wall surface of the multi-projection theater, and
a right region corresponding to a right wall surface of the multi-projection theater,
wherein
the front region comprises a screen area, and
the left region or the right region comprises a masking area.

14. The guide image generation method of claim 13, wherein the guide image is an image corresponding to a plane development showing the front surface, the left wall surface and the right wall surface of the multi-projection theater.

* * * * *